Patented Apr. 20, 1954

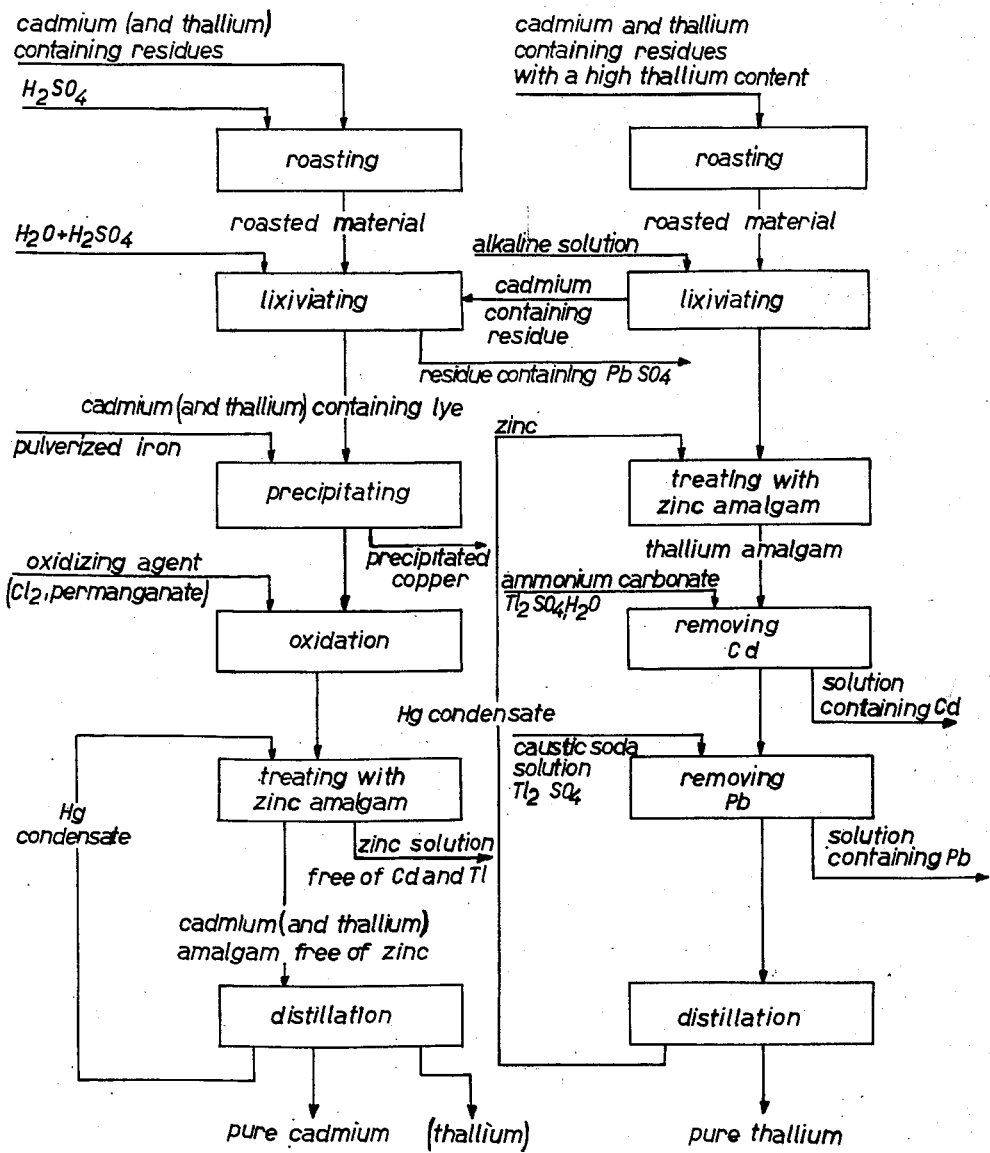

2,676,096

UNITED STATES PATENT OFFICE 2,676,096

PROCESS FOR THE RECOVERY OF CADMIUM FROM CADMIUM CONTAINING RESIDUES

Oskar Emert, Duisburg-Wedau, and Peter von der Forst and Hans Zirngibl, Duisburg, Germany, assignors to Duisburger Kupferhuette, Duisburg, Germany Application October 23, 1951, Serial No. 252,814

Claims priority, application Germany November 3, 1950

14 Claims. (Cl. 75—71)

This invention relates to improvements in the treatment of cadmium containing residues.

The recovery of cadmium metal from residues containing cadmium, as for example flue dust from lead works, or residues from the purification of zinc solutions with zinc dust, was conventionally effected in two ways.

One of the conventional methods was effected as follows:

After if necessary roasting the residues with sulfuric acid, and subsequently treating them with diluted sulfuric acid or water, and purifying the solution thus obtained, pure cadmium metal was recovered by means of electrolytic separation.

The second method conventionally used consisted of forming a cadmium solution in a similar manner, precipitating the cadmium out of the purified solution with zinc sheet metal or zinc dust, and working up the resulting cadmium sludge to commercial metal.

The electrolytic separation of cadmium has the disadvantage that a very extensive and complicated purification of the solution is necessary, to remove certain detrimental constituents such as chlorides, arsenic, copper, iron, nickel, cobalt and thallium. The electrolysis requires relatively strong concentrations of cadmium in the original electrolytes, and thus in many cases where the raw material has a relatively low cadmium content, a special process is necessary to enrich the cadmium concentration. Precipitation of the cadmium with zinc sheet metal or zinc dust can similarly only be carried out from well purified solutions.

In these conventional processes, commercial metal can be directly smelted out of the resulting cadmium sludge, or, as is necessary in most cases, pure metal can be obtained by distillation.

If the residues from which the cadmium is to be recovered contain thallium, this thallium must be removed during the purification of the solution, by being precipitated out in the form of a chloride, iodide or chromate. The thallium may also be removed by a cementation process. The preparation of thallium or its salts in the pure form from the precipitate has thus far proven particularly complicated and expensive. It is separated from other metals by repeated precipitation processes, and is obtained in the form of its salts, or in metal form, by means of electrolysing the thallium sulfate solution.

One object of this invention is the recovery of cadmium from cadmium containing residues without the aforementioned difficulties.

A further object of this invention is a new and simplified process for the recovery of cadmium and thallium from residues containing these metals. The flowsheet on the drawing illustrates the steps of the process. These and still further objects will become apparent from the following description.

It has been found that it is possible to treat cadmium containing residues which may also contain other metals such as thallium, lead, zinc, iron, nickel, copper, cobalt and arsenic, in such a way, that cadmium metal is very simply produced. According to the invention, the cadmium is dissolved with sulfuric acid as a sulfate, after, if necessary, the residues have been roasted with the addition of sulfuric acid. Such a roasting process is necessary if the residues contain sulfide sulfur, which hinders the dissolving of the cadmium with sulfuric acid. Moreover in the case of flue dusts containing arsenic, the influence of the sulfuric acid removes a large part of the arsenic out of the material during the roasting process, in the form of arsenic trioxide. Any copper which is dissolved with the cadmium is then precipitated out of the solution, the remaining cadmium in the solution is then converted into cadmium amalgam with zinc amalgam and the cadmium metal is separated from the mercury by distillation.

The amalgam containing zinc which is used for the amalgam exchange with the solution containing cadmium and thallium, can contain zinc in any desired concentration, as long as the fluidity of the amalgam is preserved. It has been found desirable to work with an amalgam solution saturated with about 2 per cent. of zinc at 20° C.

The precipitation of the copper dissolved with the cadmium may be effected in any known manner, as, for example, with iron. In treating the copper free cadmium solution with zinc amalgam, the consumption of zinc in the form of zinc amalgam in the exchange with the metal-salts solution is in the stoichiometric proportion, between zinc on the one hand, and cadmium and thallium on the other hand. The cadmium amalgam may be produced according to the known manner in a concentrated crystalline form, so that the distillation may be effected in a particularly economical manner. A considerable advantage is obtained according to the new process in that it is not necessary to purify the cadmium bearing solution, except as mentioned, of the copper content. Any other metals present, such as iron, cobalt and zinc, and chlorides, will not disturb, even in comparatively large concentrations, the amalgam exchange which renders the complete separation of the cadmium from these metals.

According to the new process, it is possible to obtain a cadmium which is substantially free of zinc directly from residues and solutions, even if the same have high zinc contents. It is possible, for example, to dissolve cadmium bearing zinc metal directly in mercury, so that the zinc is removed by treating the amalgam so obtained with cadmium bearing solutions, and subjecting the cadmium amalgam to distillation. If the cadmium containing residues also contain thallium, both metals may be dissolved, for example, with sulfuric acid, and converted into an amalgam by treating the cadmium-thallium bearing solutions with zinc amalgam. The cadmium-thallium amalgam may then be fractionated into cadmium, thallium, and mercury, by means of a fractional distillation, preferably under vacuum.

When using a continuous distillation, the thallium-cadmium amalgam flows into the evaporator, where the cadmium and mercury evaporate, and are separated in a fractionating column. The thallium remains as a residue in the still, and may be removed from time to time. When using a discontinuous distillation, the mercury is first distilled off from the amalgam at a lower temperature, and subsequently the cadmium is distilled off at a higher temperature, both metals being trapped separately, and the thallium being recovered as a residue in the still.

While cadmium, entirely free of mercury, can only be obtained from the cadmium amalgam by distilling off the mercury, if a part, as for example, about 30% of the cadmium is distilled off at the same time, the separation is practically complete in the presence of the greatest possible quantity of thallium. It has been found advantageous to allow a quantity of thallium to remain in the still, equal to at least twice the quantity of cadmium to be distilled off.

If the residues to be treated also contain chlorides, the solubility of thallium in the sulfate solution is greatly reduced. It has been found desirable, particularly in the presence of high thallium concentration, to oxidize the residues, if not already present in salt form. The oxidation is preferably effected in a hot air current, at a temperature of between 300° C. and 600° C. After the oxidation, the thallium chloride is extracted with hot water with, for example, the addition of sodium carbonate to provide for an alkaline reaction. In this way, the cadmium is almost completely prevented from passing into solution. The thallium in this hot circulated solution may then be converted with zinc amalgam into thallium amalgam. In this manner, the thallium may be concentrated in the mercury, according to its solubility, into an amalgam of more than 40%. If such high concentrations are desired, the zinc necessary for the conversion must be added gradually, due to its considerably lower mercury solubility. The residue, free of thallium, is treated with sulfuric acid to eliminate the cadmium and, if necessary, any copper is precipitated out of the cadmium sulfate solution, and the purified cadmium sulfate solution is treated with zinc amalgam.

In order to obtain particularly pure thallium from the thallium amalgam, it has been found advantageous to remove the small quantities of lead and cadmium, traces of which may appear in the thallium solution, and thus in the amalgam. These small quantities of lead and cadmium may be removed by treatment with an oxidizing agent such as peroxide, or with soluble thallium salts, such as thallium sulfate, in the case of cadmium, in an ammoniacal solution of ammonium carbonate, and in the case of lead, in a solution of sodium hydroxide. Depending upon the quantity of lead or cadmium in the amalgam, the necessary quantity of oxidizing material must be regulated, as a surplus would also eliminate the thallium. From this purified thallium amalgam, very pure metal may be recovered by distilling off the mercury, or pure thallium salt can be obtained by decomposition by acids. Any arsenic present in the residues treated according to the invention can be eliminated in the known manner, as for example, by treatment with sulfuric acid at high temperatures, whereby most of the arsenic is evaporated. Any traces of arsenic, which pass into the cadmium solution in the trivalent form, can be oxidized with strong oxidizing agents such as potassium permanganate into the pentavalent form. It has been surprisingly found that pentavalent arsenic does not cause any trouble, or interfere in any way, in the treatment of cadmium solution with zinc amalgam, if the arsenic concentration is kept under about 5 grams per litre.

It has been further found that the low simultaneous separation of nickel, in the form of a solid nickel-zinc amalgam, which is noticeable with a neutral or weak acid solution, can be almost completely avoided by using a higher content of free acids in the solution of, for example, about 30–50 grams per litre, while maintaining the temperature below about 30° C., and preferably at about 20° C. When proceeding in this manner, care must be taken to avoid disturbance by stirring in air.

The other solid insoluble amalgam components, as for example, iron metals, zinc amalgams and copper-zinc amalgams, which lessen the fluidity of the amalgams, can be separated from the liquid cadmium-thallium amalgam by filtering or decanting.

The following examples are given further to illustrate the invention, and not to limit same, the invention being limited by the appended claims.

*Example 1*

10 kilograms of a cadmium bearing residue with 5 per cent. of cadmium, 30 per cent. of zinc, and 4 per cent. of nickel, are treated with 30 litres of a 30 per cent. sulfuric acid at 70° C. After precipitating the small quantity of copper with 30 grams of iron dust, the solution is separated from the residue by filtration. It contains 16.5 grams of cadmium, 100 grams of zinc and 40 grams of sulfuric acid per litre. By vigorous stirring of the solution, now cooled to 20° C., with 14.5 kilograms of a 2 per cent. zinc amalgam, a cadmium amalgam free of zinc is obtained with 3.34 per cent. of cadmium. By dissolving further quantities of zinc, and repeated conversion with cadmium solution, it is possible further to strengthen the cadmium in the amalgam, and obtain by distillation a pure metal, containing less than 0.001 per cent. of zinc, and 0.001 per cent. of mercury.

*Example 2*

1 kilogram of a residue from the purification process of a zinc solution with zinc dust, containing 21.6 per cent. of cadmium, and 4 per cent. of thallium, is dissolved with 2 litres of a 40 per cent. sulfuric acid at 60° C. The solution, after the insoluble residue has been separated off, contains 105 grams of cadmium, and 20 grams of thallium per litre, and is stirred with 6.4 kilograms of a 2 per cent. zinc amalgam, until the zinc has been completely exchanged. Through distillation in a fractionating column in vacuo, pure cadmium and a thallium metal are obtained out of the amalgam, the latter containing only small quantities of lead, cadmium and mercury.

Example 3

10 kilograms of a residue from the purification process of a zinc solution with zinc dust, containing 25 per cent. of cadmium and 6 per cent. of thallium, are oxidized in an air-current at 400° C., and then stirred with 50 litres of hot, weak soda solution. The hot thallium solution is stirred with 4.8 kilograms of a 2 per cent. zinc amalgam for one hour; leaching and amalgam treatment are then repeated. The residue then contains only traces of thallium. The amalgam now contains 11.3 per cent. of thallium, no zinc, and only small impurities of cadmium and lead. By distillation a 99.98 per cent. thallium is obtained.

Example 4

1 kilogram of a thallium amalgam with 26.9 per cent. of thallium, which contains in the thallium content 0.24 per cent. of cadmium, is stirred with 300 ccs. of a solution of 100 grams of ammonia, and 100 grams of ammonium carbonate per litre at 25° C. After 6 ccs. of a 4 per cent. hydrogen peroxide solution have been added drop by drop, the solution contains a small amount of thallium, which is detected by the yellow colouring of the iodide. The thallium metal obtained from the amalgam by distilling off the mercury, contains less than 0.001 per cent. of cadmium.

Example 5

1 kilogram of a thallium amalgam with 11.3 per cent. of thallium and 0.1 per cent. of lead, is stirred with 300 ccs. of a 10 per cent. caustic soda solution at 50° C. After 30 ccs. of a 1 per cent. hydrogen peroxide solution have been added, the removal of the lead is complete, as is shown by the small quantity of thallium remaining in the watery solution. The lead content in the thallium metal produced by distilling off the mercury is less than 0.001 per cent.

Example 6

1 kilogram of a 20 per cent. thallium amalgam polluted with 1 per cent. of lead, is stirred with 200 ccs. of a 10 per cent. caustic soda solution at 50° C., and then a slow air current to oxidize the lead is allowed to work upon the agitated surface of the amalgam, until the lead in the amalgam passes over into the watery phase, as is shown by the small quantity of thallium remaining in the solution.

Example 7

1 kilogram of a 20 per cent. thallium amalgam with 0.5 per cent. of cadmium and 0.5 per cent. of lead, is stirred with 200 ccs. of an ammoniacal solution of 25 grams of thallium sulfate, by which process the cadmium in the amalgam is completely exchanged with the thallium in the solution. After removing the ammoniacal solution, the amalgam is stirred with 200 ccs. of a 10 per cent. caustic soda solution, in which 13 grams of thallium sulfate are dissolved. The thallium metal, produced by distillation out of the purified thallium amalgam, contains only 0.001 per cent. of cadmium, and 0.001 per cent. of lead.

Example 8

10 kilograms of flue dust from lead works with 3.0 per cent. of cadmium, 0.62 per cent. of thallium, and 5 per cent. of arsenic, are dissolved by treatment with sulfuric acid at 500° C., thus removing up to 0.5 per cent. of arsenic, and stirred with 20 litres of a 5 per cent. sulfuric acid at 60° C. After precipitating the copper with sodium sulfide, the solution is separated from the residue by filtration. It contains 14.2 grams of cadmium, 3.1 grams of thallium, and 1.5 grams of arsenic per litre, and small quantities of iron and nickel, 0.3 gram per litre of the arsenic content is in a trivalent form, and is oxidized with 5 grams of potassium permanganate into arsenic acid. By vigorous stirring of the solution with 3.75 kilograms of a 2 per cent. zinc amalgam, all of the cadmium and thallium pass into the amalgam, which is then free of zinc.

Through distillation in a fractionating column in vacuo, cadmium is obtained with less than 0.001 per cent. mercury content, and thallium remains as a residue practically free from cadmium and mercury.

Example 9

300 ccs. of chlorine gas are slowly stirred into 1 litre of a cadmium sulfate solution, which contains 1 gram of trivalent arsenic per litre of solution. An analysis of the arsenic shows that the solution contains only pentavalent arsenic. A small remaining quantity of chlorine is expelled by an air current. The solution prepared in this way is exchanged with zinc amalgam, by which process no decomposition of the amalgam is caused by the precipitated arsenic.

Example 10

40 litres of a cadmium sulfate solution which contains 62 grams of cadmium, 60 grams of zinc, and 4 grams of nickel per litre, are brought into a solution with concentrated sulfuric acid, until the solution contains 40 grams of free acid per litre, and is then treated with 72 kilograms of a 2 per cent. zinc amalgam at 20° C. The amalgam, which is now free of zinc, contains 3.3 per cent. of cadmium, and less than 0.005 per cent. of nickel.

We claim:

1. Process for the recovery of cadmium metal from cadmium containing residues, which comprises dissolving the cadmium contained in such residues with sulfuric acid as sulfate, precipitating out any copper present in the resulting solution, contacting the cadmium with zinc amalgam to form cadmium amalgam, and separating the cadmium from the mercury by distillation.

2. Process according to claim 1, in which such residues are roasted prior to said dissolving with sulfuric acid.

3. Process according to claim 2, in which said roasting is effected in the presence of sulfuric acid.

4. Process according to claim 1, in which any thallium present in such residues is dissolved along with the cadmium by the sulfuric acid, converted with the cadmium into cadmium-thallium amalgam by contact with zinc amalgam, and in which the cadmium, thallium and mercury are separated by distillation.

5. Process according to claim 1, in which such residues have a high thallium content, and in which the residues are oxidized, and the thallium separated with an alkaline solution prior to said dissolving of the cadmium with sulfuric acid, the separated thallium contacted with zinc amalgam to form thallium amalgam, and thallium metal recovered therefrom.

6. Process according to claim 5, in which the residues are oxidized with air at a temperature of about 300° C. to 600° C.

7. Process according to claim 6, in which the thallium amalgam is treated with an oxidizing agent to remove any traces of cadmium and lead contained therein.

8. Process according to claim 7, in which said oxidizing agent is a peroxide.

9. Process according to claim 1, in which such residues have a high thallium content, and includes oxidizing such residues, removing the thallium therefrom with an alkali solution prior to said dissolving of the cadmium with sulfuric acid, contacting the thallium with zinc amalgam to form thallium amalgam, contacting the cadmium amalgam with a soluble thallium salt in an ammoniacal solution of ammonium carbonate to remove any cadmium therefrom, and in a solution of sodium hydroxide to remove any lead therefrom, and recovering thallium metal.

10. Process according to claim 9, in which said soluble thallium salt is thallium sulfate.

11. Process according to claim 1, which includes eliminating any arsenic contained in such residues, by subjecting the same to treatment with sulfuric acid at elevated temperatures, and oxidizing any remaining dissolved trivalent arsenic with a strong oxidizing agent into pentavalent arsenic, before contacting with zinc amalgam.

12. Process according to claim 11, in which said strong oxidizing agent is potassium permanganate.

13. Process according to claim 1, in which said contacting with zinc amalgam is effected in the presence of at least 30 grams of free acid per litre of solution at a temperature below about 30° C.

14. Process according to claim 13, in which said contacting with zinc amalgam is effected in the presence of about 30 to 50 grams of free acid per litre of solution at a temperature of about 20° C.

References Cited in the file of this patent

UNITED STATES PATENTS

| Number | Name | Date |
|---|---|---|
| 1,118,944 | Lyons | Dec. 1, 1914 |
| 1,552,506 | Read | Sept. 8, 1925 |
| 1,827,755 | Kirsebom | Oct. 20, 1931 |

OTHER REFERENCES

"Metal Industry," page 377, June 15, 1945.

"Metal Transactions," pages 205–208, March 1949.

"Comprehensive Treatise on Inorganic and Theoretical Chemistry," by Mellor, vol. 4, 1923, page 1038.